(12) United States Patent
Park et al.

(10) Patent No.: US 7,968,228 B2
(45) Date of Patent: Jun. 28, 2011

(54) SECONDARY BATTERY

(75) Inventors: Jeongman Park, Yongin-si (KR);
Kwangchun Kim, Yongin-si (KR);
Sangsok Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 365 days.

(21) Appl. No.: 11/410,496

(22) Filed: Apr. 24, 2006

(65) Prior Publication Data

US 2006/0263648 A1 Nov. 23, 2006

(30) Foreign Application Priority Data

Apr. 26, 2005 (KR) .................. 10-2005-0034749

(51) Int. Cl.
*H01M 2/34* (2006.01)
*H01M 2/04* (2006.01)
*H01M 2/08* (2006.01)
*H01M 2/36* (2006.01)

(52) U.S. Cl. ........... 429/182; 429/94; 429/175; 429/174

(58) Field of Classification Search .............. 429/7, 94, 429/175, 174, 181, 72; 29/623.1
See application file for complete search history.

(56) References Cited

U.S. PATENT DOCUMENTS

| 2005/0014064 | A1* | 1/2005 | Matsubara | 429/180 |
| 2005/0106454 | A1* | 5/2005 | Kozu et al. | 429/175 |
| 2006/0127756 | A1* | 6/2006 | Seo | 429/175 |
| 2006/0210870 | A1* | 9/2006 | Moon et al. | 429/175 |

FOREIGN PATENT DOCUMENTS

CN 1508891 A 6/2004

* cited by examiner

*Primary Examiner* — Dah-Wei Yuan
*Assistant Examiner* — Angela J. Martin
(74) *Attorney, Agent, or Firm* — Christie, Parker & Hale, LLP

(57) ABSTRACT

A secondary battery including an electrode assembly having a positive electrode plate, a negative electrode plate and a separator being wound together, a can for receiving the electrode assembly; the can having an opening. A cap assembly includes a cap plate having an electrolyte injection hole, the cap assembly sealing the opening of the can. A lead plate is welded to an exterior-facing surface of the cap plate so as to cover the electrolyte injection hole and a protection circuit board is electrically coupled to the cap assembly. At least one positioning member is located to be aligned with at least one edge of the lead plate, the at least one positioning member defining a region for receiving the lead plate.

9 Claims, 7 Drawing Sheets

SECONDARY BATTERY

CROSS REFERENCE TO RELATED APPLICATION

This application claims priority to and the benefit of Korean Patent Application No. 2005-0034749, filed Apr. 26, 2005 in the Korean Intellectual Property Office, the entire content of which is incorporated herein by reference.

BACKGROUND OF THE INVENTION

1. Field of the invention

The present invention relates to a secondary battery, and more particularly to a secondary battery having an improved lead plate securing structure.

2. Description of the Prior Art

Secondary batteries, also known as rechargeable batteries, have been recently researched and developed to have a reduced size and an increased capacity. Representative secondary batteries which have been recently developed and used include a nickel hydrogen battery, a lithium battery, a lithium ion battery, and the like.

In secondary batteries, most bare cells are manufactured in such a manner that an electrode assembly including a positive electrode, a negative electrode and a separator is received in a can made of aluminum or aluminum alloys. A cap assembly is assembled with the can, electrolyte is injected into the can, and the can is sealed. Having a can made of aluminum or aluminum alloys allows a durable lightweight secondary battery to be manufactured such that the secondary battery does not corrode even after long periods of use.

A bare cell is provided with an electrode terminal insulated from the periphery of the bare cell. The electrode terminal is connected to one electrode of the electrode assembly in the bare cell to act as a positive electrode terminal or a negative electrode terminal. The can has a polarity opposite to the electrode terminal.

A battery is an energy source which may discharge a large amount of energy. In the case of the secondary battery, the battery accumulates energy as it is charged. During charging, if an internal short circuit occurs in the secondary battery, the secondary battery may discharge accumulated energy in a short period of time, thereby causing a safety hazard such as a fire or an explosion.

In lithium-based secondary batteries, since lithium is highly reactive, there is a potential for secondary batteries to catch fire and/or explode if the batteries malfunction. In lithium ion batteries, ionized lithium is used rather than metallized lithium, so lithium ion batteries have improved stability as compared to lithium batteries using metallized lithium. However, since the negative electrode or material such as non-hydrogenous electrolyte is flammable, lithium ion batteries still have the potential to catch fire and/or explode if they malfunction.

Therefore, to prevent a secondary battery from catching fire and/or exploding due to charging malfunction, secondary batteries are provided with various safety devices. When the temperature or the voltage of a secondary battery drastically increases due to excessive charging or discharging, the safety devices interrupt electric current to prevent the secondary battery from catching fire and/or exploding. The safety devices are connected to the bare cell, and may include a protection circuit board which detects abnormal electric current or voltage and interrupts the flow of the electric current. The safety devices may also include a positive temperature coefficient element and bimetal, etc. which deform when the secondary battery is overheated due to the abnormal current.

Typically, the electric connection formed by welding the protection circuit board to the electrode of the bare cell is relatively weak because of material characteristics and shape of the bare cell. Thus, a conductive structure, called a lead plate, acts to connect the electric terminal of the safety device to the positive electrode and the negative electrode. Nickel, nickel alloys, or a stainless steel plated with nickel is typically used as material for the lead plate. Generally, the bare cell and the protection circuit board are electrically connected to each other by welding.

Figure 1:
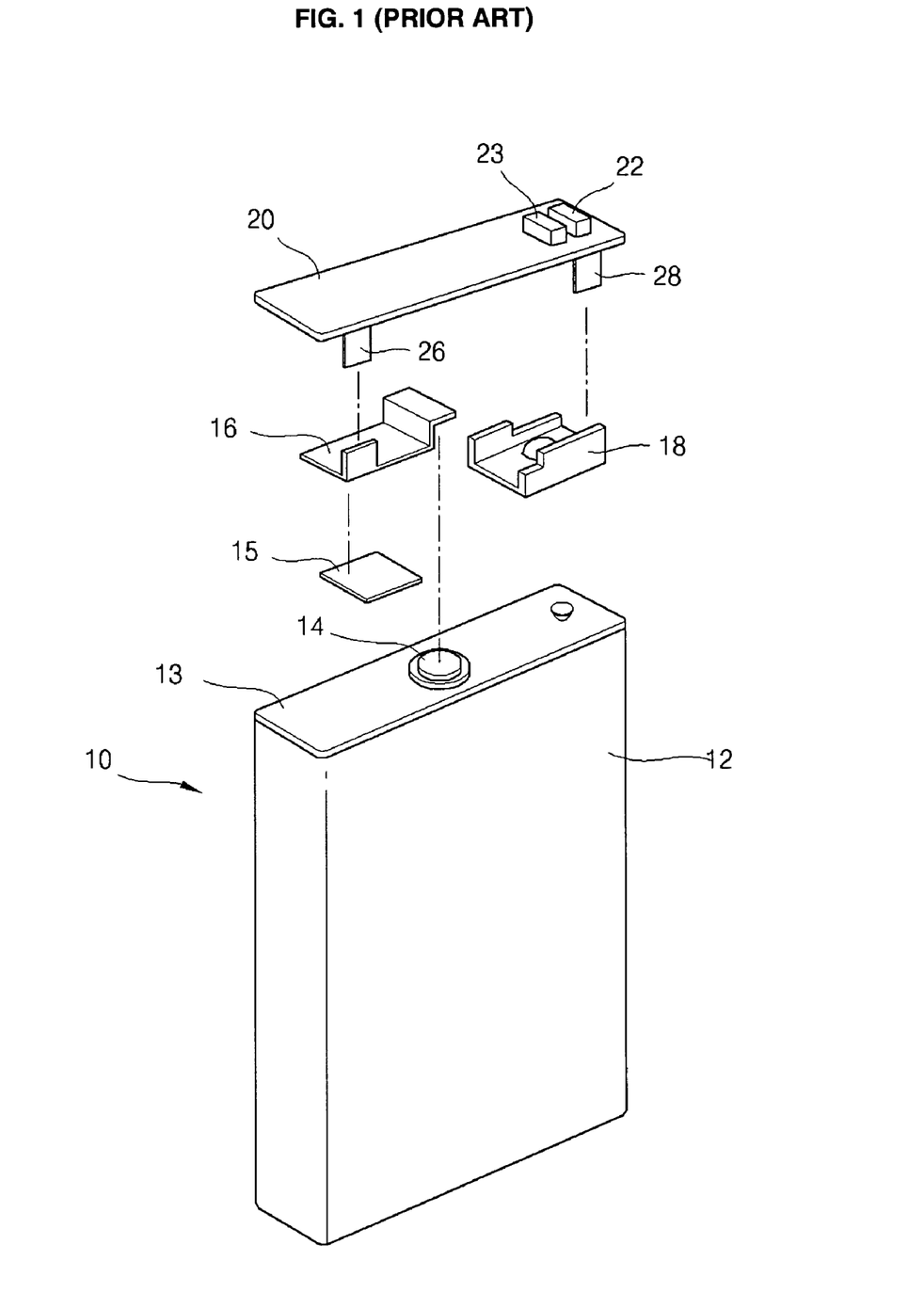
FIG. 1 is an exploded perspective view schematically showing a conventional secondary battery before molding resin is attached to the secondary battery.
Figure 2:
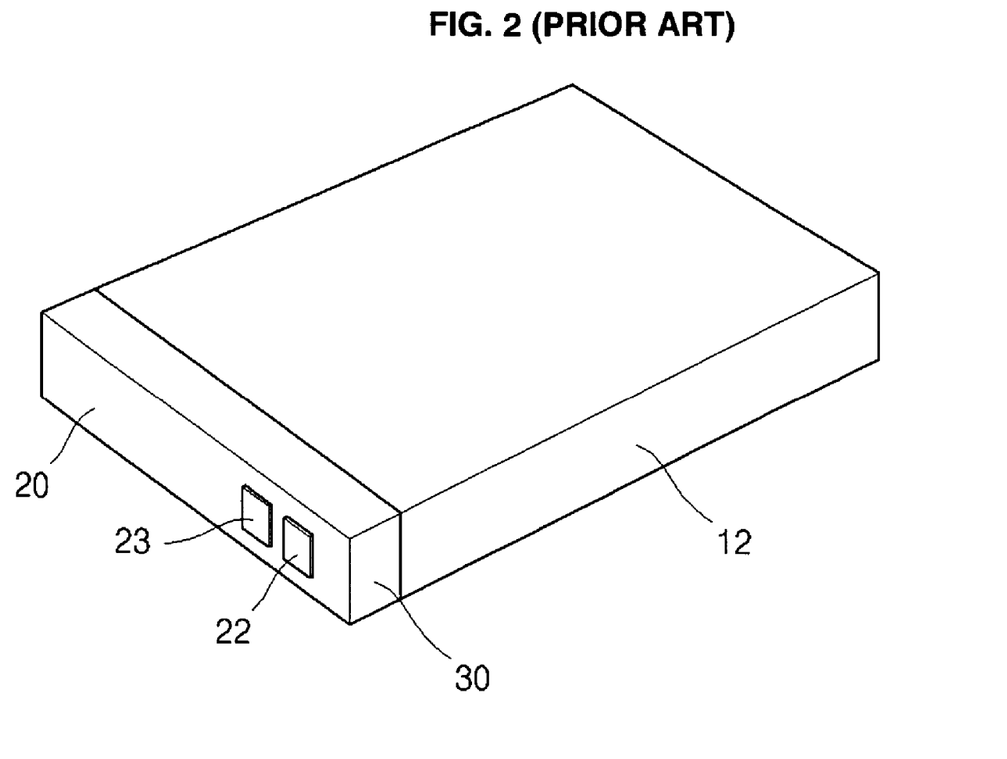
FIG. 2 is an exploded perspective view showing a conventional secondary battery, in which a protection circuit board is molded with molding resin and attached to a bare cell.

FIG. 1 is an exploded perspective view schematically showing a conventional lithium secondary battery before molding resin is attached to the secondary battery. FIG. 2 is an exploded perspective view showing a conventional secondary battery in which a protection circuit board is molded with molding resin and attached to a bare cell. As shown in FIGS. 1 and 2, the can type secondary battery includes a bare cell 10 and a protection circuit board 20. The bare cell 10 is a can 12 which receives an electrode assembly therein and of which an upper end is sealed by a cap plate assembled with a cap assembly.

The cap plate 13 has a size and a shape corresponding to the opened upper end of the can 12. The cap plate 13 includes a cathode contact lead 16 and a lead plate 18 attached to an exterior facing surface of the cap plate. A negative electrode terminal 14 extends through a center portion of the cap plate 13. The cathode contact lead 16 has one end coupled to the negative electrode terminal 14, and the other end extending over the exterior-facing surface of the cap plate 13. The lead plate 18 is attached to the exterior-facing surface of the cap plate 13 such that sidewalls of the lead plate 18 extend away from the can 12.

The protection circuit board 20 has an exterior surface on which external input and output terminals 22, 23 are formed, and an interior surface to which a circuit portion (not shown) and contact terminals 26, 28 are provided. The contact terminals 26, 28 include an anode contact terminal 26 and a cathode contact terminal 28, which are formed in a generally L shape to connect the contact terminals 26, 28 to the lead plates 16, 18, respectively. The lead plates 16, 18 of the cap plate 13 and the contact terminals 26, 28 are generally welded together by resistance spot welding. An insulation plate for electrically insulating the cathode contact lead 16 and the cap plate 13 may be provided.

As shown in FIG. 2, the protection circuit board 20 is molded by a molding portion 30, and then attached to the bare cell 10. The external input and output terminals 22, 23 protrude from a surface of the molding portion 30.

In the conventional secondary battery constructed as described above, the lead plate may become distorted or disengaged from the can 12 when the lead plate is welded to an electrolyte injection hole of the cap plate by a torch. Further, in distortion tests for the can, the lead plate may become deformed due to external force.

SUMMARY OF THE INVENTION

A secondary battery is provided which includes a structure capable of fixing a lead plate onto an upper surface of a cap plate, thereby improving a welding strength and preventing the lead plate from being distorted due to external force.

A secondary battery is provided including an electrode assembly having a positive electrode plate, a negative electrode plate and a separator wound together. A can houses the electrode assembly and has an opening for receiving the electrode assembly. The can is coupled to the positive electrode plate. A cap assembly seals the opening of the can and the cap assembly includes a cap plate having an electrolyte injection hole. A lead plate is welded to an exterior-facing surface of the cap plate proximate to the electrolyte injection hole. The secondary battery also includes a protection circuit board having a pair of battery terminals, one battery terminal being electrically coupled to the can through the lead plate and the other battery terminal being electrically coupled to the negative electrode. At least one positioning member is located on the cap plate and defines a region for receiving the lead plate such that at least one edge of the lead plate is aligned with the at least one positioning member.

The positioning member may include L shaped protrusions. In one exemplary embodiment, the positioning member includes island type protrusions for holding four corners of the lead plate. The positioning member may include a pair of protrusions which are formed at two diagonally opposed corners of the upper surface of the cap plate.

Further, the positioning member may include a protrusion which is formed with a wall shape so as to surround four lateral sides and four corners of the lead plate.

The positioning member may include island type protrusions which are formed to correspond to four lateral sides of the lead plate. The positioning member may include embossed protrusions which are formed to correspond to four lateral sides of the lead plate.

The positioning member is formed to correspond to a center portion of each lateral side of the lead plate, or one end of each lateral side of the lead plate.

DETAILED DESCRIPTION

Figure 3:
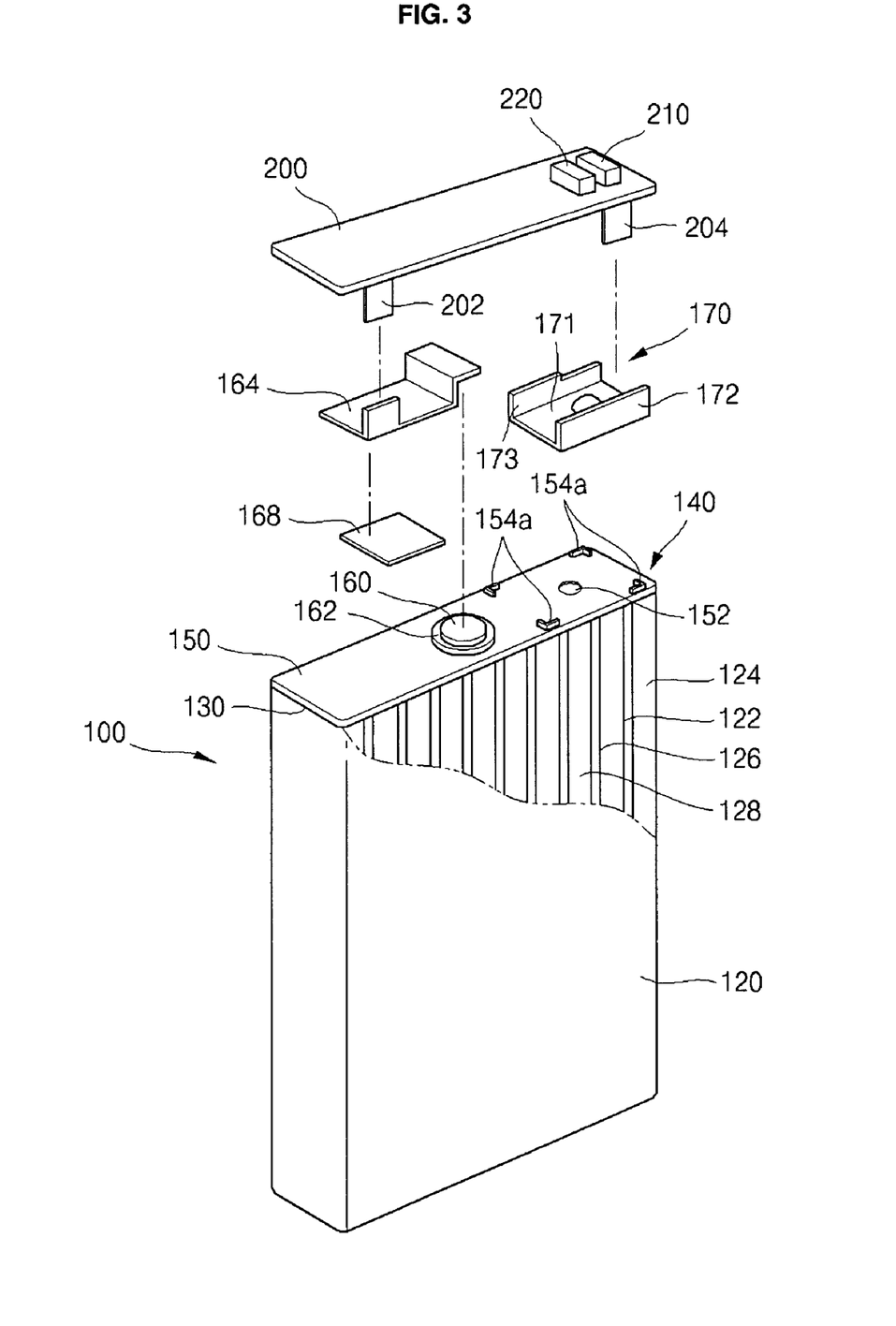
FIG. 3 is an exploded and partially cut-away perspective view of a secondary battery according to an embodiment of the present invention.

As shown in FIG. 3, the secondary battery according to the present invention includes a bare cell 100 and a protection circuit board 200. The bare cell 100 includes a can 120 adapted to receive an electrode assembly, one end of the can being sealed by a cap assembly 140.

In a polygonal lithium ion battery, the can 120 is made of metal and may be a substantially rectangular hexahedron with an open end. Typically, the can 120 is made of aluminum or aluminum alloys which are lightweight and have excellent corrosion resistance. The can 120 receives the electrode assembly 122 including a positive electrode 124, a separator 126 and a negative electrode 128, and electrolyte. After the electrode assembly is inserted into the can 120, the opening 130 of the can 120 is sealed with a cap assembly 140. Such a cap assembly 140 includes a cap plate 150, an electrode terminal 160 and a lead plate 170.

The cap plate 150 has a size and a shape which corresponds to the opening formed at the upper end of the can 120. The cap plate 150 has a through-hole (not shown) and an electrolyte injection hole 152. The electrode terminal 160 extends through the through-hole. The electrolyte injection hole 152 allows for electrolyte to be injected into the can 120. The electrolyte injection hole 152 may be sealed by a plug after the electrolyte is injected into the can 120. The cap plate 150 may be made from aluminum or aluminum alloys like the can 120 to improve the welding capability of the cap plate 150 to the can 120.

A tube-shaped gasket 162 is inserted between the electrode terminal 160 and the cap plate 150 to electrically insulate the electrode terminal 160 and the cap plate 150. The electrode terminal 160 is typically used as a negative electrode terminal. An insulation plate (not shown) may be disposed near the through-hole on the cap plate 150, while a terminal plate (not shown) may be attached to the insulation plate. A cathode contact lead 164 is disposed on the electrode terminal 160 and welded to a contact terminal 202 of the protection circuit board 200 to electrically connect the electrode terminal 160 to the negative electrode of the protection circuit board 200.

The lead plate 170 may include an oblong plate body 171 having sidewalls 172, 173 integrated with the plate body 171. A contact terminal 204 of the protection circuit board 200 is welded to the sidewall 172 so as to electrically connect the protection circuit board 200 to the cap plate 150. The lead plate 170 is fixed to the cap plate 150 by laser welding the lead plate adjacent to the electrolyte injection hole 152. The electrolyte injection hole 152 may be sealed by a plug (not shown).

Figure 4:
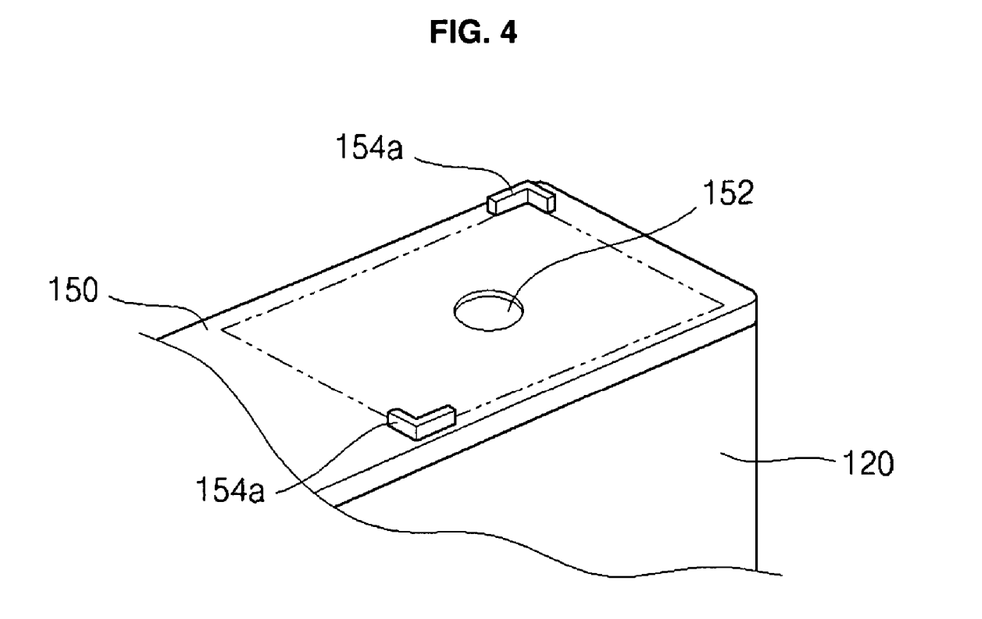
FIGS. 4 and 5 are views of a secondary battery according to another embodiment of the present invention.
Figure 5:
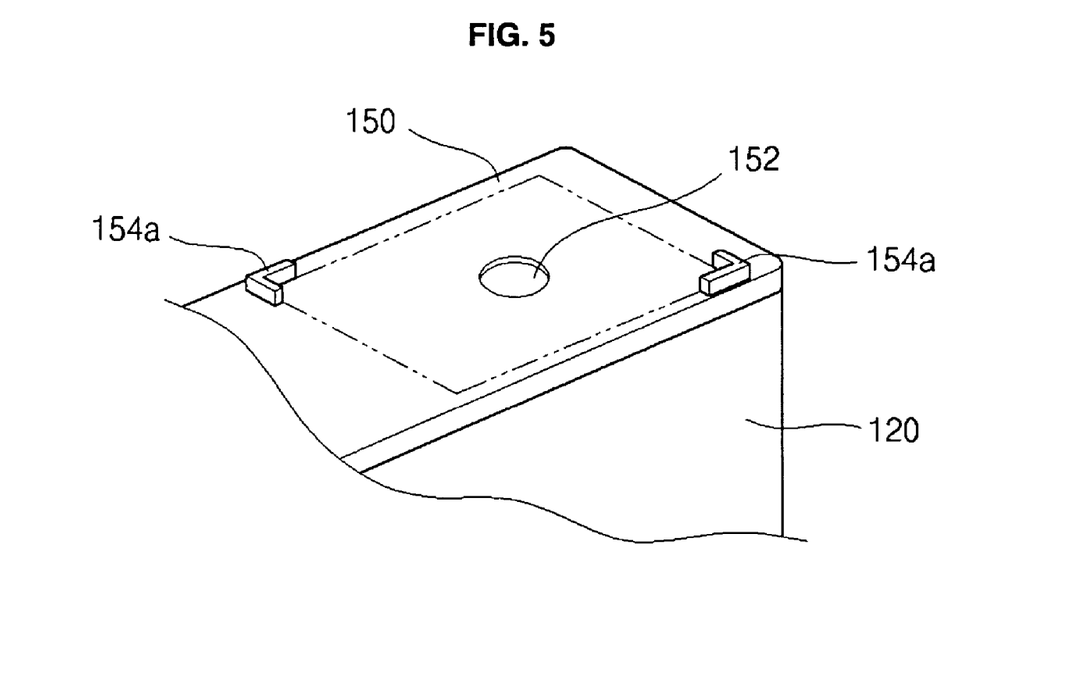

Generally L-shaped positioning protrusions 154a are located around the electrolyte injection hole 152 on the cap plate 150 so as to correspond to four corners of the plate body 171 and to define a region for receiving the plate body 171. In another embodiment shown in FIGS. 4 and 5, the positioning protrusions may be located at only the positions corresponding to diagonally opposite corners of the lead plate 170. Although the two positioning protrusions are located at positions corresponding to the diagonally opposite two corners as described above, they exhibit substantially the same effect as that of the four positioning protrusions located to correspond to the four corners of the lead plate 170, thereby reducing the manufacturing cost of the secondary battery.

Figure 6:
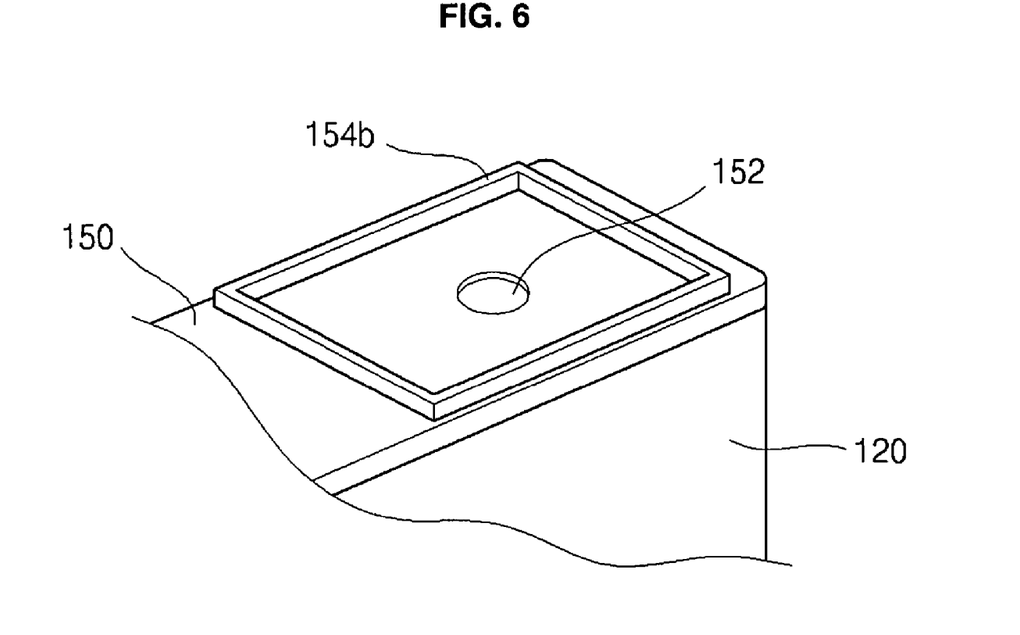
FIG. 6 is a perspective view of a positioning member in a secondary battery according to yet another embodiment of the present invention.

According to still another embodiment of the present invention, as shown in FIG. 6, a positioning protrusion 154b may be formed as a continuous wall to surround the plate body 171 of the lead plate 170.

Figure 7:
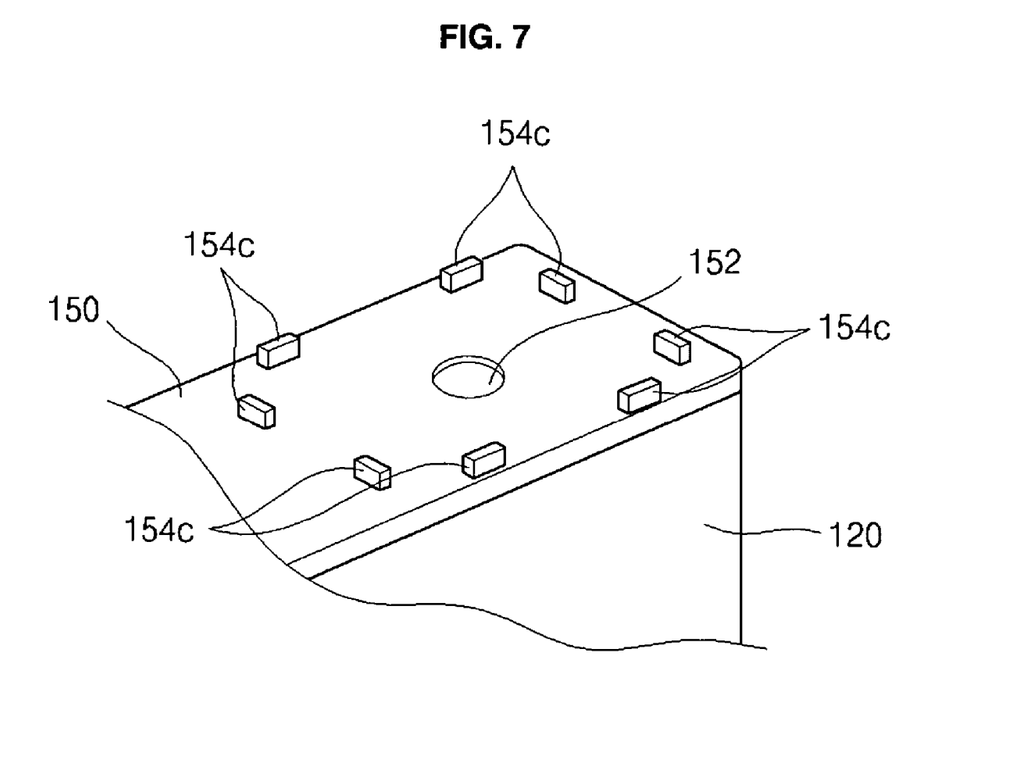
FIG. 7 is a perspective view of a positioning member in the secondary battery according to still another embodiment of the present invention.
Figure 8:
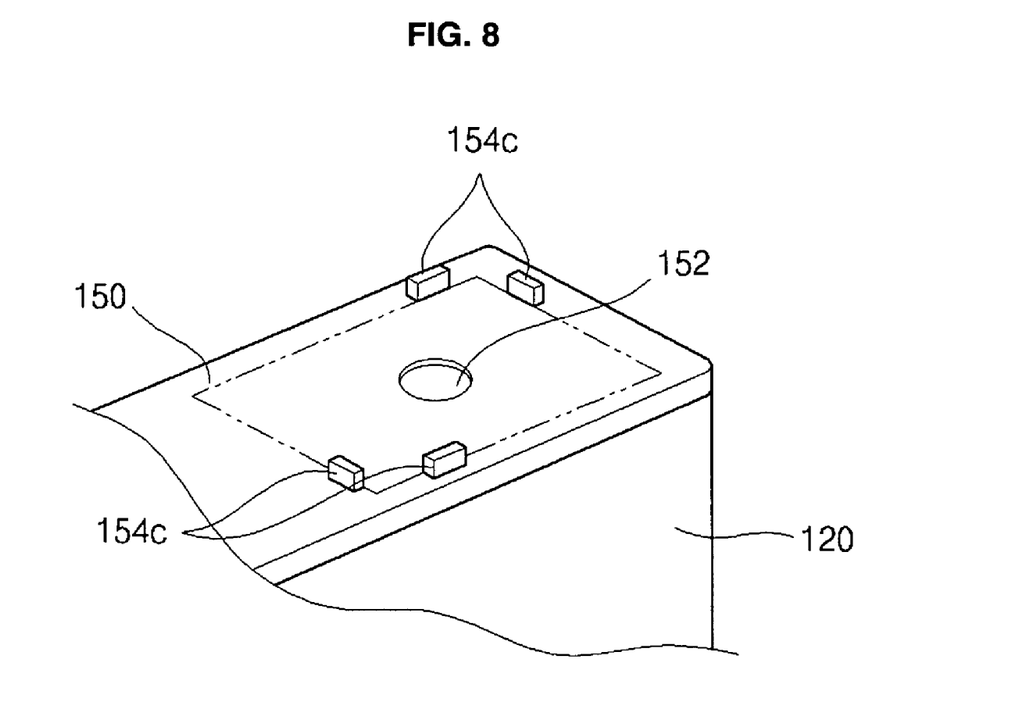
FIGS. 8 and 9 are views of a secondary battery according to another embodiment of the present invention.
Figure 9:
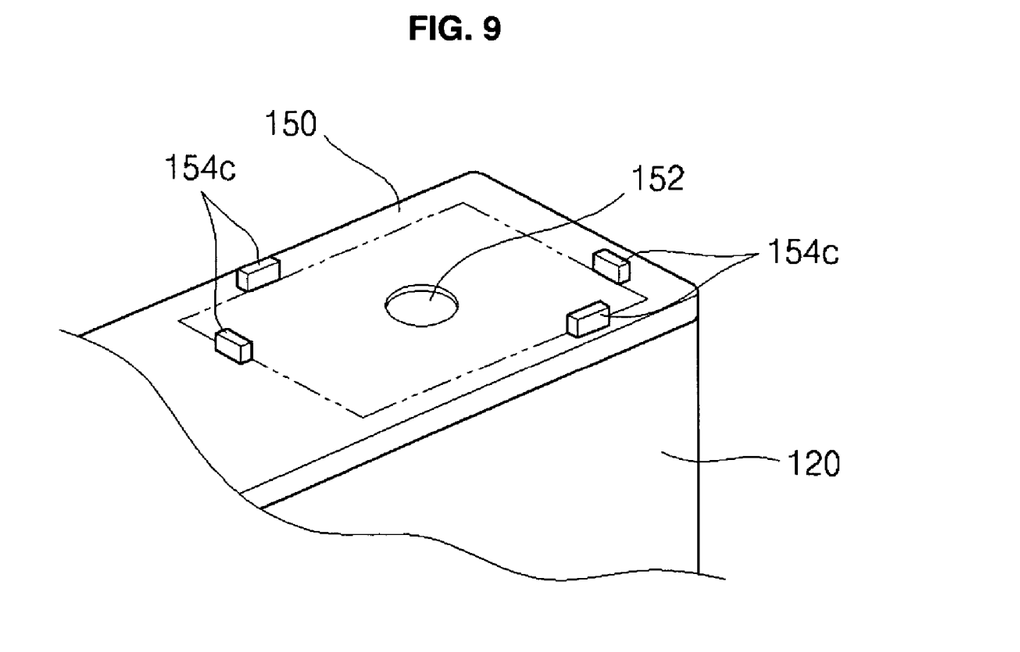

FIG. 7 shows yet another embodiment of the present invention, in which four pairs of island type positioning protrusions 154c are aligned along edges of the lead plate 170. Each pair of the island type positioning protrusions 154c may be created by removing the corner portion of the positioning protrusion 154a. The island type positioning protrusions may also be located to correspond to a pair of diagonally opposed corners of the lead plate 170, as shown in FIGS. 8 and 9.

Figure 10:
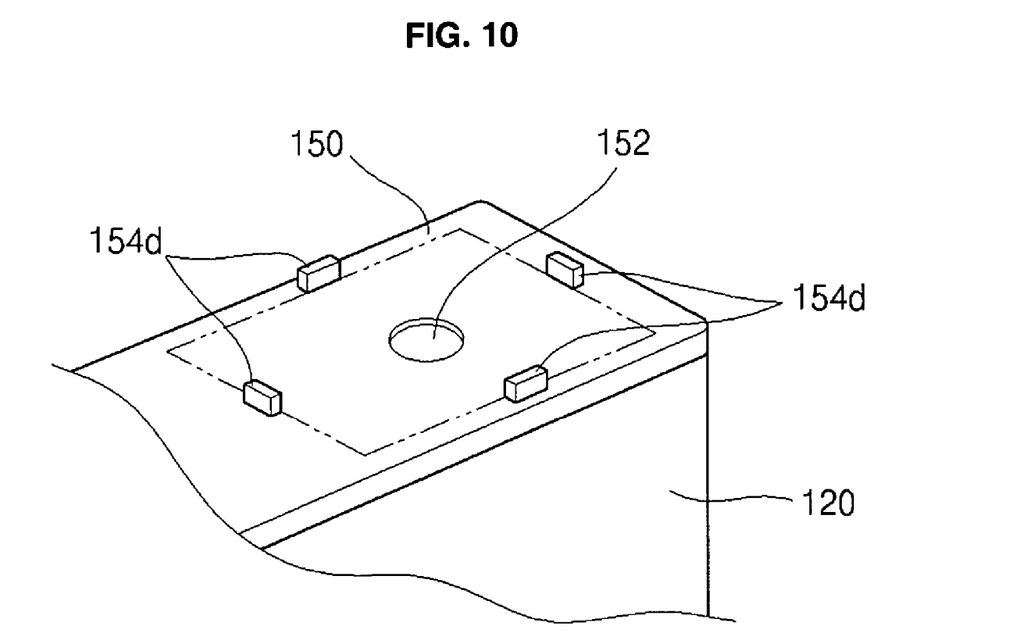
FIG. 10 is a perspective view of a positioning member in a secondary battery according to still another embodiment of the present invention.
Figure 11:
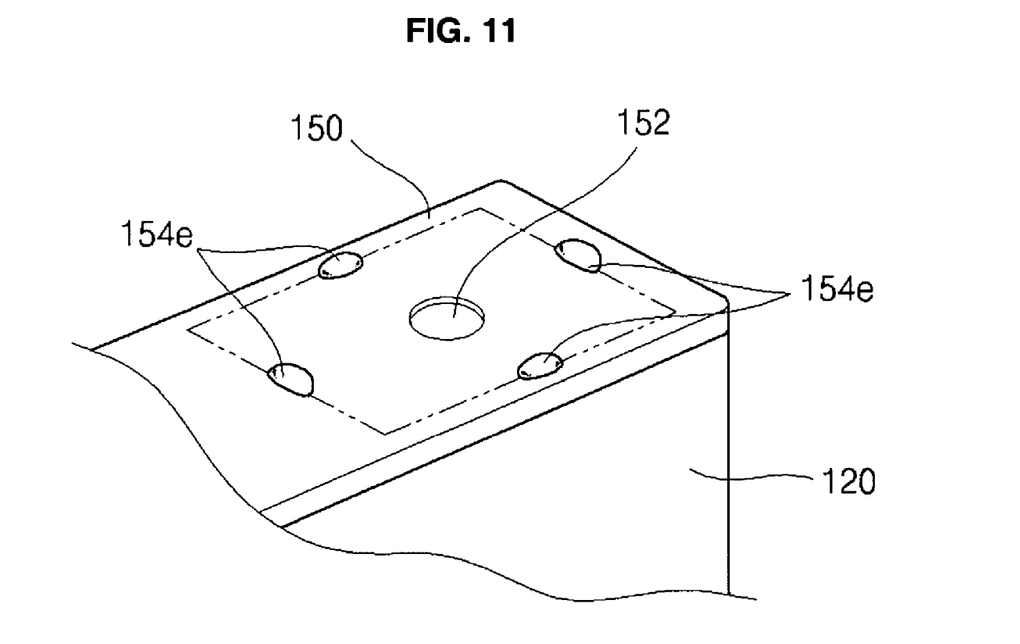
FIG. 11 is a view of a variation of a secondary battery according to yet another embodiment of the present invention.

As shown in FIG. 10, the positioning protrusions may be located to correspond to a center portion of each lateral side of the lead plate 170. The positioning protrusions may be placed anywhere along an edge of the lead plate 170 so as to define a region for receiving the plate body 171. Such a positioning protrusion may include a island type positioning protrusion 154d, or an embossed type positioning protrusion 154e (FIG. 11).

Hereinafter, the operation of the secondary battery according to the present invention as constructed above will be described.

In a process of welding the lead plate 170 to the electrolyte injection hole 152 of the cap plate 150 during manufacturing of the secondary battery the lead plate 170 is fixed to the cap plate 150 with the aid of, for example, positioning protrusions 154a, 154b, 154c, 154d, or 154e, as described above.

The four corners or four lateral sides of the lead plate 170 are safely received and fixed to the cap plate 150 using the positioning protrusions 154a, 154b, 154c, 154d, or 154e as a guide. The lower surface of the lead plate 170 may then be welded to the electrolyte injection hole 152 of the cap plate 150 so as to prevent the lead plate 170 from being twisted or becoming detached.

Even if an external force is applied to the secondary battery, the lead plate 170 remains firmly fixed to the upper surface of the cap plate 150 with the aid of the positioning protrusions 154a, 154b, 154c, 154d or 154e.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
    an electrode assembly comprising a positive electrode plate, a negative electrode plate and a separator wound together;
    a can housing the electrode assembly and having an opening for receiving the electrode assembly, the can being coupled to the positive electrode plate;
    a cap assembly sealing the opening of the can, the cap assembly comprising:
        a cap plate having an exterior facing surface and an electrolyte injection hole, and
        a lead plate attached to the exterior-facing surface proximate to the electrolyte injection hole, the lead plate having at least one side wall; and
    a protection circuit board having a pair of battery terminals, one of the pair of battery terminals being electrically coupled to the can by the lead plate and the other of the pair of battery terminals being electrically coupled to the negative electrode, and
    at least one positioning member on and protruding from the cap plate having a wall abutting the at least one side wall of the lead plate to substantially prevent lateral movement of the lead plate relative to the cap plate.

2. The secondary battery as claimed in claim 1, wherein the at least one positioning member comprises at least two L-shaped protrusions.

3. The secondary battery as claimed in claim 1, wherein the at least one positioning member comprises island type protrusions.

4. The secondary battery as claimed in claim 2, wherein the at least one positioning member comprises a pair of positioning members diagonally opposed on the exterior facing surface of the cap plate.

5. The secondary battery as claimed in claim 1, wherein the at least one positioning member comprises a continuous wall surrounding the lead plate.

6. The secondary battery as claimed in claim 1, wherein the at least one side wall of the lead plate comprises a plurality of side walls and wherein the at least one positioning member comprises island type protrusions located to correspond to a respective side wall of the plurality of side walls.

7. The secondary battery as claimed in claim 1, wherein the at least one positioning member is an embossed protrusion.

8. The secondary battery as claimed in claim 6, wherein the at least one positioning member is aligned with a center of a respective one of the plurality of side walls of the lead plate.

9. The secondary battery as claimed in claim 6, wherein the at least one positioning member is aligned with an end of the lead plate.

* * * * *